United States Patent [19]

Yamada

[11] Patent Number: 4,523,783
[45] Date of Patent: Jun. 18, 1985

[54] WINDOW MOULD

[76] Inventor: Yoshiyasu Yamada, No. 4-46-27, Kamisuna-cho, Tachikawa, Japan

[21] Appl. No.: 539,551

[22] Filed: Oct. 6, 1983

[30] Foreign Application Priority Data

Nov. 27, 1982 [JP] Japan .................... 57-208281
May 31, 1983 [JP] Japan .................... 58-97463

[51] Int. Cl.³ .................................. B60J 1/02
[52] U.S. Cl. .......................... 296/93; 52/208
[58] Field of Search ........... 296/93, 84 D; 52/208, 52/716; 49/495

[56] References Cited

U.S. PATENT DOCUMENTS 4,434,593 3/1984 Norike et al. .................... 296/93

FOREIGN PATENT DOCUMENTS 57-55611 3/1982 Japan .
58-48549 4/1983 Japan .

Primary Examiner—Robert R. Song
Attorney, Agent, or Firm—Leydig, Voit, Osann, Mayer and Holt, Ltd.

[57] ABSTRACT

In a window pane mounting arrangement, there is proposed an improved window moulding which can be assuredly and neatly fitted to a clearance defined between the edge of the window pane and the peripheral flange of the window opening. The window moulding comprises an elongate band portion adapted to cover the clearance, and first and second leg portions depending and diverging from the inboard surface of the band portion and disposed in the clearance. The first and second leg portions are resiliently deformable toward each other, the first leg portion having a first engaging portion which is lockably engaged with the inboard edge of the window pane while the second leg portion having separated second and third engaging portions which are resiliently engaged with the flange.

7 Claims, 7 Drawing Figures 4,523,783

WINDOW MOULD

BACKGROUND OF THE INVENTION

The present invention relates in general to a window pane mounting arrangement for mounting a window pane to the vehicle body to close a window opening formed in the vehicle body, and more particularly to a window mould which is fitted to a continuous space or clearance defined between the peripheral edge of the window pane and the marginal wall portion of the window opening so that upon completion of fitting of it to the clearance, the window mould becomes an ornament to the window pane mounting arrangement.

SUMMARY OF THE INVENTION

According to the present invention, there is provided an improved window mould which can be neatly fitted to the space or clearance defined between the peripheral edge of the window pane and the marginal wall portion of the window opening without producing any unsightly crumples even at a curved section of the parting clearance.

According to the present invention, there is provided an improvement in a window pane mounting arrangement including a panel of the vehicle body which defines therein a peripherally flanged window opening, a window pane having a peripheral edge disposed adjacent the flange of the panel thereby to define therebetween a clearance, the pane having outboard and inboard surfaces, an adhesive material partially disposed in the clearance to bond the flange and the inboard surface of the window pane, and a window mould or moulding of elastic material adapted to be fitted to the clearance so that upon completion of the fitting thereof to the clearance, it becomes an ornament of the window pane mounting arrangement. The improvement is that the window moulding comprises an elongate strap or band portion adapted to cover the clearance throughout the entire length of the same, the strap portion having outboard and inboard surfaces; and first and second leg portions depending and diverging from the inboard surface of the elongate strap portion and disposed in the clearance with the respective leading or free ends of them embedded in the adhesive material, the first and second leg portions being resiliently deformable toward each other, the first leg portion having a first engaging portion which is lockably engaged with the inboard edge of the window pane, the second leg portion having separated second and third engaging portions which are resiliently engaged with the flange, all of the engaging portions being located on the outer sides of their associated leg portion.

BRIEF DESCRIPTION OF THE DRAWINGS

Objects and advantages of the present invention will become apparent from the following description when taken in conjunction with the accompanying drawings, in which.

DESCRIPTION OF CONVENTIONAL WINDOW MOULDS

Prior to describing the detail of the present invention, two conventional window moulds will be described with reference to FIGS. 1 to 4 in order to clarify the present invention.

Figure 1:
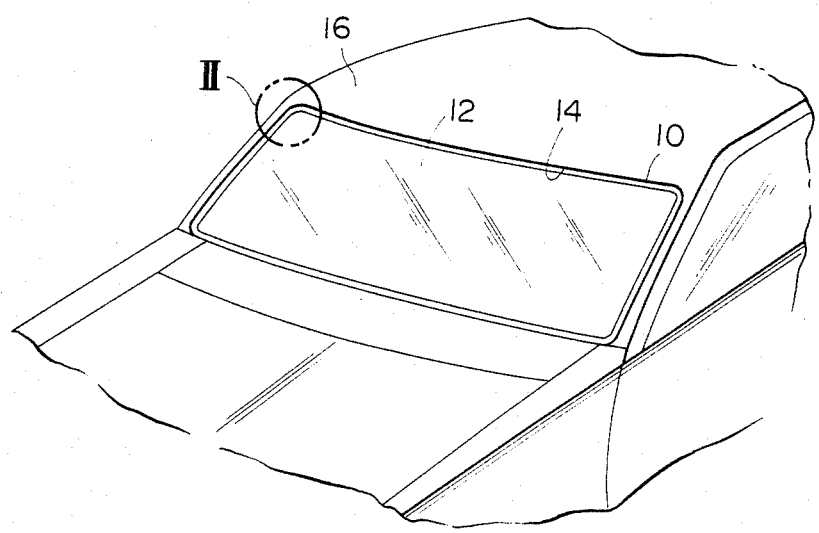
FIG. 1 is a partial perspective view of a motor vehicle having a windscreen which is mounted by way of a window moulding to the vehicle body to thereby close the windscreen opening.

As is seen from FIG. 1, the window mould 10 is fitted to a clearance which is defined between the peripheral edge of the window pane 12 and that of the window opening 14 formed in the vehicle body 6 therethroughout so that it is an ornament to the window pane mounting arrangement.

Figure 2:
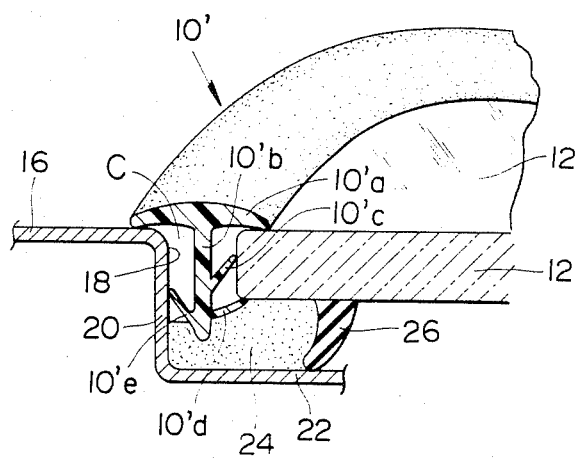
FIG. 2 is a sectional view of a conventional window moulding under practical use, which view is corresponding to the sectional view taken at the portion enclosed by the circle II of FIG. 1.
Figure 3:
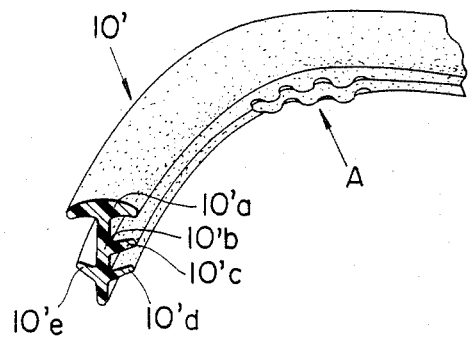
FIG. 3 is a partial perspective view of the conventional window moulding, showing a crumpled curved portion.

Referring to FIG. 2, there is shown a conventional window mould or moulding 10' practically used in a window pane mounting arrangement. The window opening 14 closed by the window pane 12 is hemmed by a generally continuous flanged portion 18 which comprises a wall portion 20 defining the peripheral edge portion of the opening 14 and a flange portion 22 generally perpendicularly extending from the wall portion 20 thereby to form around the window opening 14 a so-called window pane mounting recess. The window pane 12 is bonded at its marginal inboard area to the flange portion 22 by an adhesive 24 in such an arrangement that the marginal edge of the pane 12 is equally spaced from the wall portion 20 therethroughout. A sealing member 26, such as a rubber lip, is previously bonded to the peripheral inner side of the window pane 12 in order that during assembly, the non-cured adhesive 24 is prevented from flowing into the vehicle cabin side. The window moulding 10' is placed in the clearance C defined between the marginal edge of the window pane 12 and the wall portion 20 of the window opening 14. The window mould 10' is constructed of moulded plastics, moulded rubber, or the like and comprises a strap or band portion 10'a acting as the ornament, a leg portion 10'b depending from the lower surface of the strap portion 10'a, two branched portions 10'c and 10'd obliquely upwardly extending from one side of the leg portion 10'b, and another branch portion 10'e obliquely upwardly extending from the other side of the leg portion 10'b. As is seen from FIG. 2, upon assembly, the branch portions 10'c and 10'e are resiliently engaged with the peripheral edge surface of the window pane 12 and the wall portion 20 of the window opening 14, respectively, and at the same time, the branch portion 10'd is engaged with the inboard side surface (the surface facing the vehicle cabin) of the window pane 12. The leading end of the leg portion 10'b is embedded in the adhesive 24. With this arrangement, the window mould 10' is tightly fitted to the parting clearance C and becomes an ornament to the window pane mounting arrangement.

However, the above-mentioned window mould 10' has a drawback originating from its inherent construction. That is, as is understood from FIG. 3, when applied to a curved section of the clearance C, the window mould 10' tends to produce crumples A at the branch portions 10'c and 10'd and a conspicuous inward inclination (inclination toward the window pane 12) at the other branch portion 10'e. This is because, at the curved section, the branch portions 10'c and 10'd are applied with considerable compression stress and the branch portion 10'e is applied with considerable stretching stress. The formation of such crumples on the branch portions 10'c and 10'd causes insufficient or improper engagement of the portions 10'c and 10'd with the peripheral edge of the window pane 10, and the occurrence of the inward inclination of the branch portion 10'e causes disengagement of the portion 10'e from the wall portion 20 of the window opening 14. Thus, it often happens that by the time of the complete curing of the adhesive 24, the window mould 10' is unseemly raised at the curved section of the clearance C thereby to worsen the appearance of the window mould 10' considerably.

Figure 4:
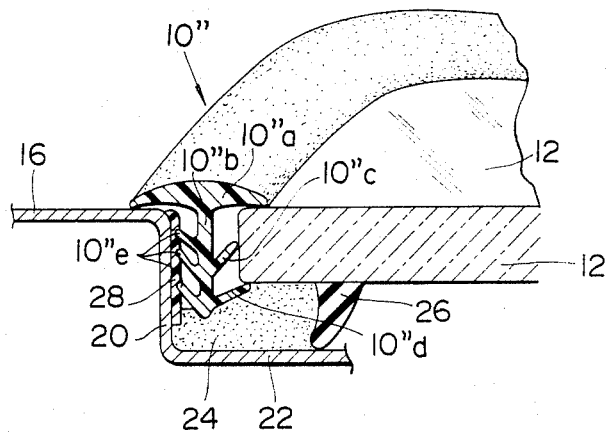
FIG. 4 is a view similar to FIG. 2, but showing another conventional window moulding under practical use.

Referring to FIG. 4, there is shown another conventional window mould 10" under practical use. In this mould 10", three banch portions 10"e are formed on the outer side of the leg portion 10"b. A plurality of holders 28 of elastic material each having a corrugated surface are bonded at suitable intervals to the wall portion 20 of the window opening 14. Upon assembly, the branch portions 10"c and 10"d are resiliently engaged with the peripheral edge of the window pane 12 similar to the case of FIG. 2, while, the other three branch portions 10"e are engaged at their leading ends with the corrugations of the holders 28.

Because of the assured engagement of the branch portions 10"e with the corrugated holders 28 bonded to the wall portion 20, the unseemly raising phenomenon of the window mould 10" at the curved section of the clearance C is somewhat reduced. However, a perfect solution to the raising phenomenon is not achieved even when using such window mould 10'. On the contrary, usage of the holders 28 makes the assembly process of the window pane mounting arrangement considerably troublesome thereby increasing the production cost of same.

DETAILED DESCRIPTION OF THE INVENTION

In order to achieve the above-mentioned undesired phenomenon of the conventional window moulds, the present invention proposes a measure which will be described hereinnext with reference to FIGS. 5 to 7.

Figure 5:
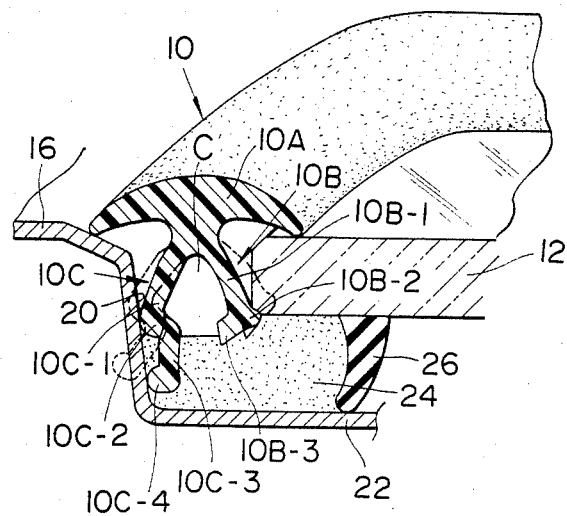
FIG. 5 is a view similar to FIG. 2, but showing a first embodiment of the present invention under practical use.

Referring to FIG. 5, there is shown a first embodiment of the present invention. The window mould 10 of this embodiment comprises an elongate band or strap portion 10A having a smoothly curved upper surface, and shorter (first) and longer (second) leg portions 10B and 10C which are projected obliquely downward from the generally middle portion of the lower side of the strap or band portion 10A. It is to be noted that the leg portions 10B and 10C extend entirely along the length of the strap portion 10A. In a non-compressed condition of the leg portions 10B and 10C wherein they are applied with no external forces, they assume their free positions as indicated by the phantom lines of FIG. 5. In this free condition, the leg portions 10B and 10C diverge from the strap portion 10A with a sufficient angle defined therebetween. The window mould 10 has in its free condition a generally reversed K-shaped cross section. The shorter leg portion 10B includes a first section 10B-1 obliquely depending from the strap portion 10A. The first section is formed at its leading end with second and third sections 10B-2 and 10B-3 which project slightly in opposite directions. As shown, the second section 10B-2 projects outward or toward the window pane, while the third section 10B-3 projects inward, that is, toward the longer leg portion 10C, so that the first, second and third sections thus united have a generally boot-shaped cross section, as shown in the drawing. While, the longer leg portion 10C includes a first section 10C-1 obliquely depending from the strap portion 10A, a second section 10C-2 extending but slightly from the first section 10C-1 inwardly toward the shorter leg portion 10B, a third section 10C-3 extending from the second section 10C-2 away from the strap portion 10A, and a fourth section 10C-4 extending outwardly but slightly from the third section 10C-3 away from the shorter leg portion 10B, as shown in the drawing. In the afore-mentioned free condition of the leg portions 10B and 10C, the shorter and longer leg portions 10B and 10C are widely opened with the inner sides of each leg portion spaced from and facing the other, so that, upon mounting of the window mould 10 to the clearance C, the outer sides of these leg portions 10B and 10C are resiliently engaged with the window pane 12 and the wall portion 20 of the window opening 14, as will be described hereinafter. It is thus to be noted that the shorter and longer leg portions 10B and 10C are each constructed to have a generally "zig-zag" cross section.

In assembly, the window mould 10 is brought to the clearance C with the shorter and longer leg portions 10B and 10C being pressed toward each other, so that upon mounting of the mould 10 to the clearance C, the leg portions 10B and 10C become opened so that the outer or outermost side of the second section 10B-2 of the shorter leg portion 10B is resiliently engaged with or locked to the inboard edge of the window pane 12 and at the same time, the outer or outermost side of the second section 10C-2 (that is the ridge defined between the first and second sections 10C-1 and 10C-2) and the outermost side of the fourth section 10C-4 of the longer leg portion 10C are resiliently engaged with the wall portion 20 of the window opening 14.

The practical use of the window mould 10 to the window pane mounting arrangement has revealed that upon completion of the mould fitting to the clearance C, the shorter and longer leg portions 10B and 10C are brought neatly close to each other without producing any unsightly crumples in the shorter leg portion 10B and conspicuous inward inclination of the longer leg portion 10C. In fact, the shorter and longer leg portions 10B and 10C keep their "zig-zag" constructions even at the time they are put into the clearance C. The reason for this advantageous result may be as follows:

Of course, like the case of the afore-mentioned conventional window moulds 10' and 10", at the curved section of the clearance C, the window mould 10 of the present invention is inevitably applied with a considerable compression stress at the shorter leg portion 10B and a considerable stretching stress at the longer leg portion 10C. However, in the present invention, the inclined arrangement of the leg portions 10B and 10C relative to the strap portion 10A and the above-mentioned "zig-zag" construction in each leg portion 10B or 10C provide these leg portions 10B and 10C with considerable stiffness against the external force applied thereto when the leg portions 10B and 10C are put into the clearance C. Thus, the leg portions 10B and 10C are prevented from showing the afore-mentioned undesirable phenomena.

Furthermore, when, by accident, the outer peripheral edge portion of the assembled window mould 10 is applied with an external force in a direction to pull out the same from the clearance C, the above-mentioned characteristic construction of the longer leg portion 10C increases assuredly the friction force created between the longer leg portion 10C and the wall portion 20 of the window opening 14. This is because, in such a condition, the external force applied to the mould 10 is substantially directly transmitted to the longer leg portion 10C to urge the same against the wall portion 20, strongly. Furthermore, even when the inner peripheral edge portion of the window mould 10 is applied with an external force in a direction to pull out the same from the clearance C, the locking engagement of the outwardly projected second section 10B-2 with the inboard edge of the window pane 12 prevents disconnection of the shorter leg portion 10B from the window pane 12. Thus, the undesirable raising phenomenon of the window mould does not occur or is at least reduced in the present invention. Although not shown in the drawings, an extra adhesive may be applied to the clearance C to assure bonding of the leg portions 10B and 10C to the wall portion 20 of the window opening 14 and the window pane 12.

Figure 6:
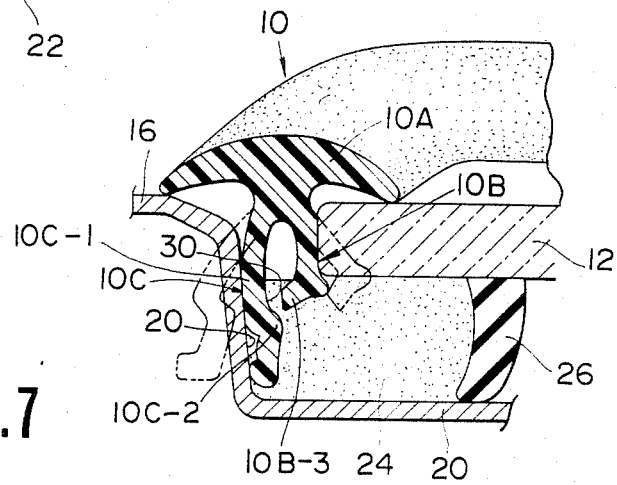
FIG. 6 is a view similar to FIG. 5, but showing a second embodiment of the present invention under practical use.
Figure 7:
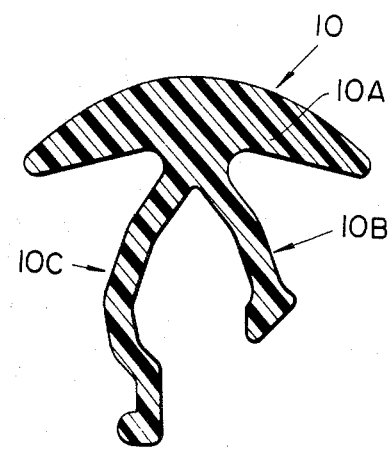
FIG. 7 is an enlarged sectional view of the window moulding of the second embodiment of the present invention.

Referring to FIGS. 6 and 7, there is shown a second embodiment of the present invention. Since the second embodiment is similar to the above-mentioned first embodiment of FIG. 5 except the construction of the shorter leg portion, the following explanation will be directed to only the shorter leg portion, and corresponding parts to those of the first embodiment are designated by the same numerals in the drawings.

As is seen in FIG. 6, in the second embodiment, the shorter leg portion 10B is so sized that when the shorter and longer leg portions 10B and 10C are brought very close to each other, the third section 10B-3 of the shorter leg portion 10B is put in recess 30 which is defined by the first and second sections 10C-1 and 10C-2 of the longer leg portion 10C. In other words, the shorter leg portion 10B of this second embodiment is shorter than that of the first embodiment, as will be seen when comparing FIG. 6 with FIG. 5. The advantage provided to the second embodiment is that the window mould 10 thereof is applicable to a clearance C which has a very limited space. In fact, at such very limited space, the third section 10B-3 of the shorter leg portion 10B can be compactly put in the recess 30 of the longer leg portion 10C thereby to reduce the substantive distance between the shorter and longer leg portions 10B and 10C in their assembled state. This is a very advantageous feature because the clearance C usually shows such a very limited space at the afore-mentioned curved section because of the inevitable error in measurement in producing a window pane mounting arrangement.

As is understood from the foregoing description, in accordance with the present invention, the undesired raising phenomenon of the window mould, which would occur particularly at the curved section of the clearance C, is assuredly prevented because of its characteristic construction practically applied to the leg portions 10B and 10C of the window mould 10.

What is claimed is:

1. In a window pane mounting arrangement including a panel of the vehicle body which defines therein a peripherally flanged window opening, a window pane having a peripheral edge disposed adjacent the flange of said panel thereby defining therebetween a clearance, said pane having outboard and inboard surfaces, an adhesive material partially disposed in said clearance to bond the flange and the inboard surface of said window pane, and a window moulding of elastic material adapted to be fitted to said clearance so that upon completion of the fitting thereof to said clearance, it becomes an ornament of said window pane mounting arrangement, THE IMPROVEMENT IN THAT said window moulding comprises:

an elongate band portion adapted to cover the entire length of the clearance throughout the entire length of the same, said band portion having outboard and inboard surfaces; and first and second leg portions depending and diverging from the inboard surface of said elongate band portion and disposed in said clearance with the respective free ends of said leg portions embedded in said adhesive material, said first and second leg portions being resiliently deformable toward each other, said first leg portion having a first engaging portion which is lockably engaged with the inboard edge of said window pane, said second leg portion having separated second and third engaging portions which are resiliently engaged with said flange, all of said engaging portions being located on the outer sides of their associated leg portions.

2. A window pane mounting arrangement as claimed in claim 1, in which said first and second leg portions depend from a common portion of said elongate band portion.

3. A window pane mounting arrangement as claimed in claim 2, in which said first leg portion includes a first section obliquely depending from the strap portion, a second section leading from the first section away from said second leg portion, and a third section projecting from the first section toward said second leg portion, so that said first, second and third sections thus united have a generally boot-shaped cross section, and in which said second leg portion includes a first section obliquely depending from the strap portion, a second section projecting from the first section toward the first leg portion, a third section leading from the second section away from the strap portion, and a fourth section projecting from the third section away from the first leg portion.

4. A window pane mounting arrangement as claimed in claim 3, in which the length of said first leg portion is shorter than that of the second leg portion.

5. A window pane mounting arrangement as claimed in claim 4 in which the sizes and shapes of said first and second leg portions are such that a recess which is defined between said first and second sections on the inner side of said second leg portion is adapted to receive the third section of the first leg portion when the first and second leg portions are brought very close to each other.

6. A window pane mounting arrangement as claimed in claim 1 wherein said free ends of said leg portions are directed away from said elongate band portion.

7. A window pane mounting arrangement according to claim 3 wherein said second and third engaging portions correspond to said second and fourth sections of said second leg portion.

* * * * *

UNITED STATES PATENT AND TRADEMARK OFFICE
CERTIFICATE OF CORRECTION

PATENT NO. : 4,523,783
DATED : June 18, 1985
INVENTOR(S) : Yoshiyasu Yamada

It is certified that error appears in the above-identified patent and that said Letters Patent is hereby corrected as shown below:

Below the information regarding the inventor on the face of the patent, please insert --Assignee: Nissan Motor Co., Ltd., Yokohama City, Japan--.

Signed and Sealed this

Fifteenth Day of October 1985

[SEAL]

Attest:

DONALD J. QUIGG

Attesting Officer

Commissioner of Patents and Trademarks—Designate